(12) United States Patent
Zelkowitz

(10) Patent No.: US 9,420,325 B2
(45) Date of Patent: Aug. 16, 2016

(54) VIRTUALIZED CONTENT SOURCING

(71) Applicant: EchoStar Technologies L.L.C., Englewood, CO (US)

(72) Inventor: Evan Zelkowitz, Denver, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 159 days.

(21) Appl. No.: 14/137,482

(22) Filed: Dec. 20, 2013

(65) Prior Publication Data
US 2015/0181275 A1 Jun. 25, 2015

(51) Int. Cl.
| | |
|---|---|
| *H04N 7/20* | (2006.01) |
| *H04N 21/4147* | (2011.01) |
| *H04H 40/90* | (2008.01) |
| *H04N 21/214* | (2011.01) |
| *H04N 21/2365* | (2011.01) |
| *H04N 21/2385* | (2011.01) |
| *H04N 21/239* | (2011.01) |
| *H04N 21/2665* | (2011.01) |
| *H04N 21/426* | (2011.01) |
| *H04N 21/61* | (2011.01) |
| *H04N 21/6377* | (2011.01) |
| *H04N 21/6587* | (2011.01) |
| *H04N 21/442* | (2011.01) |
| *H04N 21/462* | (2011.01) |
| *H04N 21/2362* | (2011.01) |
| *H04N 21/2668* | (2011.01) |

(52) U.S. Cl.
CPC .......... *H04N 21/4147* (2013.01); *H04H 40/90* (2013.01); *H04N 21/2143* (2013.01); *H04N 21/2365* (2013.01); *H04N 21/2385* (2013.01); *H04N 21/2393* (2013.01); *H04N 21/2665* (2013.01); *H04N 21/4263* (2013.01); *H04N 21/44209* (2013.01); *H04N 21/462* (2013.01); *H04N 21/6143* (2013.01); *H04N 21/6377* (2013.01); *H04N 21/6587* (2013.01); *H04N 7/20* (2013.01); *H04N 21/2362* (2013.01); *H04N 21/2668* (2013.01)

(58) Field of Classification Search
CPC ............ H04N 21/4147; H04N 21/462; H04N 21/426; H04N 21/61; H04N 21/442
USPC .................................. 725/63, 67, 68, 70, 95
See application file for complete search history.

(56) References Cited

U.S. PATENT DOCUMENTS

| | | | |
|---|---|---|---|
| 6,888,888 B1 * | 5/2005 | Tu .......................... | H03D 3/007 375/240.01 |
| 7,130,576 B1 | 10/2006 | Gurantz et al. | |
| 7,783,958 B1 * | 8/2010 | Eidson ................. | H03G 3/3068 455/452.1 |
| 7,941,091 B1 | 5/2011 | Doherty et al. | |
| 2002/0040475 A1 * | 4/2002 | Yap ....................... | G11B 27/034 725/39 |
| 2003/0110382 A1 * | 6/2003 | Leporini ................. | G06F 21/10 713/172 |
| 2003/0217362 A1 * | 11/2003 | Summers ............... | H04N 20/42 725/63 |
| 2004/0268387 A1 * | 12/2004 | Wendling ............. | H04N 5/4401 725/35 |

(Continued)

OTHER PUBLICATIONS

European Search Report mailed May 12, 2015 for EP14197945, 7 pages.

*Primary Examiner* — Nnenna Ekpo
(74) *Attorney, Agent, or Firm* — Kilpatrick Townsend & Stockton LLP

(57) ABSTRACT

Systems and methods that enable simultaneous or concurrent access to, either for display or storage, an increased number of television programs of specific interest when compared to other systems having a similar or even greater number of tuners.

15 Claims, 7 Drawing Sheets

(56) References Cited

U.S. PATENT DOCUMENTS

| | | | |
|---|---|---|---|
| 2005/0117069 A1* | 6/2005 | McNeely | H04N 5/44 348/725 |
| 2005/0144646 A1* | 6/2005 | Lecrom | G11B 27/005 725/100 |
| 2006/0225104 A1 | 10/2006 | James et al. | |
| 2007/0107019 A1* | 5/2007 | Romano | H04N 5/4401 725/80 |
| 2008/0060024 A1 | 3/2008 | Decanne | |
| 2008/0178227 A1* | 7/2008 | Petrovic | H04B 1/28 725/68 |
| 2009/0031335 A1* | 1/2009 | Hendricks | H04N 7/163 725/1 |
| 2009/0150940 A1* | 6/2009 | St.John-Larkin | H04N 7/17318 725/59 |
| 2009/0222875 A1* | 9/2009 | Cheng | H04H 20/63 725/147 |
| 2009/0290602 A1* | 11/2009 | McNeely | H04B 7/18526 370/537 |
| 2009/0320058 A1* | 12/2009 | Wehmeyer | H04N 7/17336 725/31 |
| 2010/0253785 A1* | 10/2010 | Kummer | H04N 20/12 348/192 |
| 2012/0328099 A1* | 12/2012 | Duval | H04N 21/23895 380/239 |
| 2013/0205349 A1* | 8/2013 | Chang | H04N 21/45 725/70 |
| 2014/0075576 A1* | 3/2014 | Joseph | H04N 21/2541 726/29 |
| 2014/0140259 A1* | 5/2014 | Pontual | H04W 4/06 370/312 |
| 2014/0181866 A1* | 6/2014 | Hall | 725/39 |
| 2014/0282807 A1* | 9/2014 | Joseph | H04N 21/4516 725/132 |
| 2015/0163529 A1* | 6/2015 | Faarkash | H04N 21/234327 725/109 |
| 2015/0195477 A1* | 7/2015 | White | H04N 5/20 348/731 |

* cited by examiner

VIRTUALIZED CONTENT SOURCING

BACKGROUND

The advent of the digital video recorder and the availability of high-capacity and affordable computer-readable storage devices have made available many possibilities to television programming service providers and viewers alike. In addition, television viewers have come to expect increased flexibility with respect to the accessing and recording of television programming via their television receivers.

SUMMARY

This Summary does not in any way limit the scope of the claimed subject matter.

In an aspect, a method may include receiving, by a television receiver from an outdoor satellite unit, a first television channel within a particular bandwidth that is addressable by a particular tuner of the television receiver. The method may include receiving, by the television receiver, a request to tune to a second television channel, the second television channel broadcast on a satellite transponder different than the first television channel. The method may include sending, by the television receiver to the outdoor satellite unit, a request to receive the first television channel and the second television channel within the particular bandwidth that is addressable by the particular tuner.

In an aspect, a television receiver may include a plurality of tuners; one or more processors; and a memory communicatively coupled with and readable by the one or more processors and having stored therein processor-readable instructions. The processor-readable instructions may, when executed by the one or more processors, cause the one or more processors to process a first television channel embedded within a particular bandwidth that is addressable by a particular tuner of the plurality of tuners. The processor-readable instructions may, when executed by the one or more processors, cause the one or more processors to detect a request to tune to a second television channel, the second television channel broadcast on a satellite transponder different than the first television channel. The processor-readable instructions may, when executed by the one or more processors, cause the one or more processors to send to an outdoor satellite unit a request to receive the first television channel and the second television channel within the particular bandwidth that is addressable by the particular tuner.

In an aspect, a method may include receiving, by an outdoor satellite unit from a television receiver, a request for access to a television channel broadcast on a particular satellite transponder. The method may include sending, by the outdoor satellite unit to the television receiver, the television channel and at least one other television channel embedded within a particular bandwidth that is addressable by a particular tuner of the television receiver, the at least one other television channel broadcast on a satellite transponder different than the particular satellite transponder.

DETAILED DESCRIPTION

The present disclosure is directed to or towards systems and methods that enable simultaneous or concurrent access to, either for display or storage, an increased number of television programs of specific interest when compared to other systems having a similar or even greater number of tuners. For example, in the context of a satellite television implementation, logic incorporated into one or both of an outdoor satellite unit and a television receiver coupled thereto may enable the outdoor satellite unit and television receiver together to filter a particular transport stream in response to a tune request for a particular television channel, and then place that television channel on a dedicated virtual transponder that the television receiver would then tune to. For example, assume a particular tuner is currently allocated to record a football game broadcast on television Channel A, and then a recording timer is activated to record a movie broadcast on television Channel B. In this example, it is assumed that Channel A and Channel B are broadcast on different satellite transponders. For example, Channel A may be broadcast on satellite 1 transponder 1, and Channel B may be broadcast satellite 2 transponder 1. Conventionally, since Channel A and Channel B are on different satellite transponders, another tuner different than the particular tuner would be allocated to record the movie broadcast on Channel B. This is because a particular tuner in conventional systems is typically configured to tune to a single particular transponder or transport stream at a time. The systems and methods of the present disclosure address this and other issues.

In particular, instead of allocating a different tuner to record the movie on Channel B, the outdoor satellite unit and television receiver together may filter the transport stream for Channel B at the Outdoor Satellite Unit level, and then place or insert both Channel A and Channel B onto a "virtual transponder" that the particular tuner would tune to. In general, a virtual transponder may emulate a non-virtual or real transponder. Accordingly, the particular tuner may be used to access and output both Channel A and Channel B, despite those two channels being located or broadcast by different satellite transponders. It is contemplated that such a solution may, among other things, attract new customers and increase existing customer satisfaction and loyalty by providing increased flexibility with respect to the accessing and recording of television programming. Although not so limited, an appreciation of the aspects of the present disclosure may be gained from the following in connection with the drawings.

Figure 1:
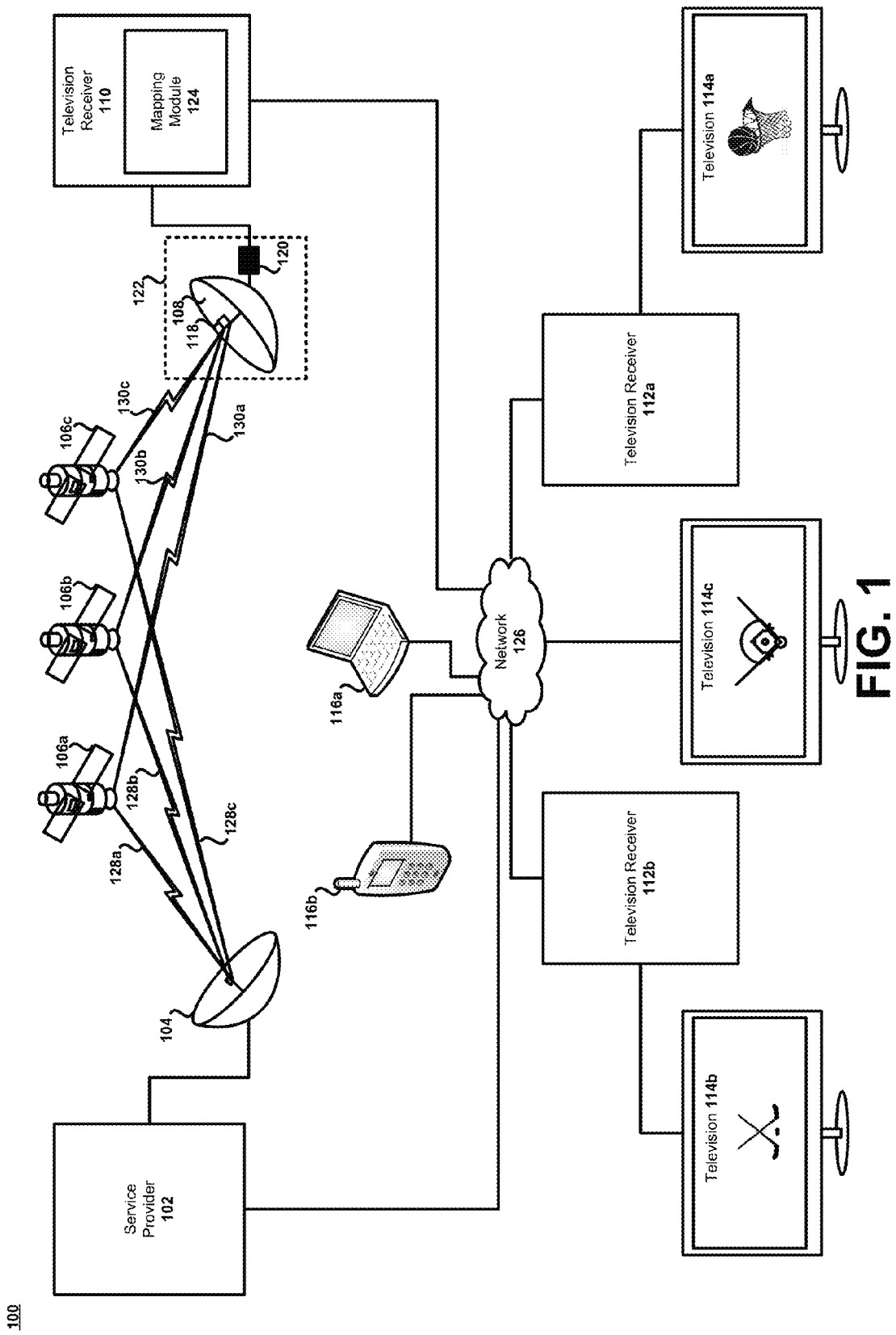
FIG. 1 shows an example satellite system in accordance with the present disclosure.

For instance, FIG. 1 illustrates an example satellite television distribution system 100 in accordance with the present disclosure. The system 100 is depicted in a simplified form, and may generally include more or fewer systems, devices, networks, and/or other components as desired. Further, number and type of features or elements incorporated within the system 100 may or may not be implementation-specific, and at least some of the aspects of the system 100 may be similar to a cable television distribution system, an IPTV (Internet Protocol Television) content distribution system, and/or any other type of content distribution system as desired.

The example system 100 may include a service provider 102, a satellite uplink 104, a plurality of satellites 106a-c, a satellite dish 108, a PTR (Primary Television Receiver) 110, a plurality of STRs (Secondary Television Receivers) 112a-b, a plurality of televisions 114a-c, and a plurality of computing devices 116a-b. In general, an LNB (Low-Noise Block Downconverter) 118 may be coupled to the satellite dish 108, and the LNB 118 together with one or more logical modules 120 and the satellite dish 108 may be incorporated within or as part of an ODU (Outdoor Satellite Unit) 122. An ODU in a satellite television implementation may refer to equipment located outside of a particular building, as opposed to equipment located within the building, such as the PTR 110 and STRs 112a-b.

Additionally, the PTR 110 may include a mapping module 124. As discussed in further detail below, one or more particular components of the ODU 122 in tandem with the mapping module 124 may be configured to enable the PTR 110 to simultaneously access and output, either for display or storage as desired, an increased number of television programs of specific interest when compared to other systems having a similar or even greater number of tuners. As mentioned above, such a solution may, among other things, attract new customers and increase existing customer satisfaction and loyalty by providing increased flexibility with respect to the accessing and recording of television programming. However, many other benefits and/or advantages are possible as well. For example, such an implementation may make better use of available hardware. In the example embodiment, hardware may be considered a restricted or limited resource, and is also resource frequently considered an option to seek reduction in cost. Being able to more fully realize or leverage television receiver tuners as discussed throughout may provide greater value to the manufacturer.

The system 100 may further include at least one network 126 that establishes a bi-directional communication path for data transfer between and among each respective element of the system 100, outside or separate from the unidirectional satellite signaling path. The network 126 is intended to represent any number of terrestrial and/or non-terrestrial network features or elements. For example, the network 126 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the system 100.

The PTR 110, and the STRs 112a-b, as described throughout may generally be any type of television receiver, television converter, etc., such as a STB (Set-Top-Box) for example. In another example, the PTR 110, and the STRs 112a-b, may exhibit functionality integrated as part of or into a television, a DVR (Digital Video Recorder), a computer such as a tablet computing device, or any other computing system or device, as well as variations thereof. Further, the PTR 110 and the network 126, together with the STRs 112a-b and televisions 114a-c, and possibly the computing devices 116a-b, may each be incorporated within or form at least a portion of a particular home computing network, and may each respectively be configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other embodiments are possible. For example, one or more of the various elements or components of the example system 100 may be configured to communicate in accordance with the MoCA® (Multimedia over Coax Alliance) home entertainment networking standard. Still other embodiments are possible.

In practice, the satellites 106a-c may each be configured to receive uplink signals 128a-c from the satellite uplink 104. In this example, each the uplink signals 128a-c may contain one or more transponder streams of particular data or content, such as one or more particular television channels, as supplied by the service provider 102. For example, each of the respective uplink signals 128a-c may contain various media content such as encoded HD (High Definition) television channels, SD (Standard Definition) television channels, on-demand programming, programming information, and/or any other content in the form of at least one transponder stream, and in accordance with an allotted carrier frequency and bandwidth. In this example, different media content may be carried using different ones of the satellites 106a-c. Further, different media content may be carried using different transponders of a particular satellite (e.g., satellite 106a); thus, such media content may be transmitted at different frequencies and/or different frequency ranges. For example, a first and second television channel may be carried on a first carrier frequency over a first transponder of satellite 106a, and a third, fourth, and fifth television channel may be carried on second carrier frequency over a first transponder of satellite 106b, or, the third, fourth, and fifth television channel may be carried on a second carrier frequency over a second transponder of satellite 106a, and etc. Each of these channels may be scrambled such that unauthorized persons are prevented from accessing the television channels.

The satellites 106a-c may further be configured to relay the uplink signals 128a-c to the satellite dish 108 as downlink signals 130a-c. Similar to the uplink signals 128a-c, each of the downlink signals 130a-c may contain one or more transponder streams of particular data or content, such as various encoded and/or at least partially electronically scrambled television channels, on-demand programming, etc., in accordance with an allotted carrier frequency and bandwidth. The downlink signals 130a-c, however, may not necessarily contain the same or similar content as a corresponding one of the uplink signals 128a-c. For example, the uplink signal 128a may include a first transponder stream containing at least a first group or grouping of television channels, and the downlink signal 130a may include a second transponder stream containing at least a second, different group or grouping of television channels. In other examples, the first and second group of television channels may have one or more television channels in common. In sum, there may be varying degrees of correlation between the uplink signals 128a-c and the downlink signals 130a-c, both in terms of content and underlying characteristics.

Further, satellite television signals may be very different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CSPAN®, ABC®, CBS®, ESPN®, etc. Further, the term "channel," may in some contexts carry a different meaning from or than its normal plain language meaning. For example, the term "channel" may denote a particular carrier frequency or "sub-band" which can be tuned to by an appropriate tuner of a television receiver. In other contexts though, the term "channel" may refer to a single program/content service such as HBO®, CSPAN®, etc. Similarly, "tuning" may refer to receiving a channel having multiple services thereon. Additionally, it will be appreciated that a single satellite may typically have multiple transponders (e.g., 32 transponders) each one broadcasting a channel or frequency band of about 24-27 MHz in a broader frequency or polarity "band" of about 500 MHz. Thus, a frequency band of about 500 MHz may contain numerous sub-bands or channels of about 24-27 MHz, and each channel in turn may carry a combined stream of digital data comprising a number of content services. Further, in many instances a single satellite may broadcast two orthogonal polarity bands of about 500 MHz. For example, a first polarity band of about 500 MHz broadcast by a particular satellite may be left-hand circular polarized, and a second polarity band of about 500 MHz may be right-hand circular polarized. Other embodiments are possible.

Continuing with the example implementation-specific scenario, the satellite dish 108 may be provided for use to receive television channels (e.g., on a subscription basis) provided by the service provider 102, satellite uplink 104, and/or satellites 106a-c. For example, the satellite dish 108 may be configured to receive particular transponder streams, or downlink signals 130a-c, from one or more of the satellites 106a-c. Based on the characteristics of the PTR 110 and/or satellite dish 108, however, it may only be possible to capture transponder streams from a limited number of transponders concurrently. For example, a tuner of the PTR 110 may be configured to tune to a single transponder stream from a transponder of a single satellite at a time.

Additionally, the PTR 110, which is communicatively coupled to the satellite dish 108, may subsequently select via tuner, decode, and relay particular transponder streams to the television 114c for display thereon. For example, the satellite dish 108 and the PTR 110 may, respectively, be configured to receive, decode, and relay at least one premium HD-formatted television channel to the television 114c. Programming or content associated with the HD channel may generally be presented live, or from a recording as previously stored on, by, or at the PTR 110. Here, the HD channel may be output to the television 114c in accordance with the HDMI/HDCP content protection technologies. Other embodiments are however possible.

Further, the PTR 110 may select via tuner, decode, and relay particular transponder streams to one or both of the STRs 112a-b, which may in turn relay particular transponder streams to a corresponding one of the televisions 114a-b for display thereon. For example, the satellite dish 108 and the PTR 110 may, respectively, be configured to receive, decode, and relay at least one television channel to the television 114a by way of the STR 112a. Similar to the above-example, the television channel may generally be presented live, or from a recording as previously stored on the PTR 110, and may be output to the television 114a by way of the STR 112a in accordance with a particular content protection technology and/or networking standard. Still further, the satellite dish 108 and the PTR 110 may, respectively, be configured to receive, decode, and relay at least one premium television channel to one or both of the computing devices 116a-b. Similar to the above-examples, the television channel may generally be presented live, or from a recording as previously stored on the PTR 110, and may be output to one or both of the computing devices 116a-b in accordance with a particular content protection technology and/or networking standard.

Figure 2:
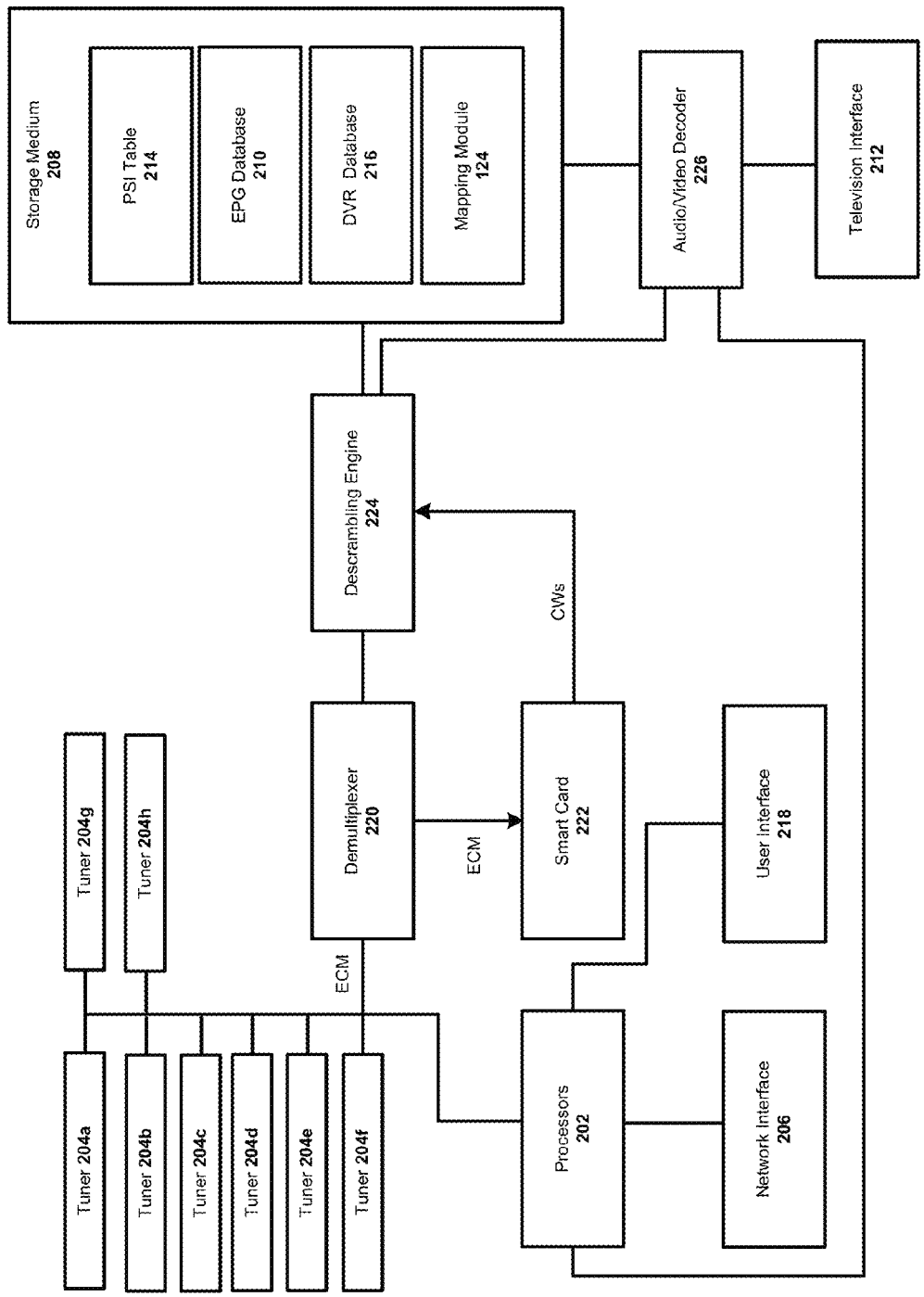
FIG. 2 shows an example block diagram of a television receiver of FIG. 1.

Referring now to FIG. 2, an example block diagram of the PTR 110 of FIG. 1 is shown in accordance with the present disclosure. In some embodiments, at least one of the STRs 112a-b may be configured in a manner similar to that of the PTR 110. In other embodiments, at least one of the STRs 112a-b may be configured to exhibit a reduced functionality as compared to the PTR 110, and may depend at least to a certain degree on the PTR 110 to implement certain features or functionality. In this example, the STRs 112a-b may be referred to as a "thin client."

For brevity, the PTR 110 is depicted in a simplified form, and may generally include more or fewer elements or components as desired in accordance with the present disclosure. For example, the PTR 110 is shown in FIG. 2 to include the mapping module 124 as mentioned above in connection with FIG. 1. Additionally, although not explicitly shown in FIG. 2, the PTR 110 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the PTR 110 may be configured to include any number of other various components or logical modules that are implemented in hardware, software, firmware, or any combination thereof, and such components or logical modules may or may not be implementation-specific.

Referring still to FIG. 2, the PTR 110 may include one or more processors 202, a plurality of tuners 204a-h, at least one network interface 206, at least one non-transitory computer-readable storage medium 208, at least one EPG (Electronic Programming Guide) database 210, at least one television interface 212, at least one PSI (Program Specific Information) table 214, at least one DVR database 216, at least one user interface 218, at least one demultiplexer 220, at least one smart card 222, at least one descrambling engine 224, and at least one decoder 226. In other embodiments, fewer or greater numbers of components may be present. Further, functionality of one or more components may be combined; for example, functions of the descrambling engine 224 may be performed by the processors 202. Still further, functionality of components may be distributed among additional components, and possibly additional systems such as, for example, in a cloud-computing implementation.

The processors 202 may include one or more specialized and/or general-purpose processors configured to perform processes such as tuning to a particular channel, accessing and displaying EPG information, and/or receiving and processing input from a user. For example, the processors 202 may include one or more processors dedicated to decoding video signals from a particular format, such as according to a particular MPEG (Motion Picture Experts Group) standard, for output and display on a television, and for performing or at least facilitating decryption or descrambling.

The tuners 204a-h may be used to tune to television channels, such as television channels transmitted via satellites 106a-c. Each one of the tuners 204a-h may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 204a) may be used to tune to a television channel on a first transponder stream for display using a television, while another tuner (e.g., tuner 204b) may be used to tune to a television channel on a second transponder for recording and viewing at some other time. If multiple television channels transmitted on the same transponder stream are desired, a particular tuner (e.g., tuner 204c) may be used to receive the signal containing the multiple television channels for presentation and/or recording of each of the respective multiple television channels, such as in a PTAT (Primetime Anytime) implementation for example. Although eight tuners are shown, the PTR 110 may include more or fewer tuners (e.g., three tuners, twelve tuners, etc.), and the features of the disclosure may be implemented similarly and scale according to the number of tuners of the PTR 110.

The network interface 206 may be used to communicate via alternate communication channel(s) with a service provider. For example, the primary communication channel between the service provider 102 of FIG. 1 and the PTR 110 may be via satellites 106a-c, which may be unidirectional to the PTR 110, and another communication channel between the service provider 102 and the PTR 110, which may be bidirectional, may be via the network 126. In general, various types of information may be transmitted and/or received via the network interface 106.

The storage medium 208 may represent a non-transitory computer-readable storage medium. The storage medium 208 may include memory and/or a hard drive. The storage medium 208 may be used to store information received from one or more satellites and/or information received via the network interface 206. For example, the storage medium 208 may store information related to the EPG database 210, the PSI table 214, and/or the DVR database 216, among other elements or features, such as the mapping module 124 mentioned above. Recorded television programs may be stored using the storage medium 208.

The EPG database 210 may store information related to television channels and the timing of programs appearing on such television channels. Information from the EPG database 210 may be used to inform users of what television channels or programs are available, popular and/or provide recommendations. Information from the EPG database 210 may be used to generate a visual interface displayed by a television that allows a user to browse and select television channels and/or television programs for viewing and/or recording. Information used to populate the EPG database 210 may be received via the network interface 206 and/or via satellites 106a-c of FIG. 1. For example, updates to the EPG database 210 may be received periodically via satellite. The EPG database 210 may serve as an interface for a user to control DVR functions of the PTR 110, and/or to enable viewing and/or recording of multiple television channels simultaneously.

The decoder 226 may convert encoded video and audio into a format suitable for output to a display device. For instance, the decoder 226 may receive MPEG video and audio from the storage medium 208, or the descrambling engine 224, to be output to a television. MPEG video and audio from the storage medium 208 may have been recorded to the DVR database 216 as part of a previously-recorded television program. The decoder 226 may convert the MPEG video and audio into a format appropriate to be displayed by a television or other form of display device and audio into a format appropriate to be output from speakers, respectively. The decoder 226 may be a single hardware element capable of decoding a finite number of television channels at a given time, such as in a time-division arrangement. In the example embodiment, eight television channels may be decoded concurrently or simultaneously.

The television interface 212 output a signal to a television, or another form of display device, in a proper format for display of video and playback of audio. As such, the television interface 212 may output one or more television channels, stored television programming from the storage medium 208, such as television programs from the DVR database 216 and/or information from the EPG database 210 for example, to a television for presentation.

The PSI table 214 may store information used by the PTR 110 to access various television channels. Information used to populate the PSI table 214 may be received via satellite, or cable, through the tuners 204a-h and/or may be received via the network interface 206 over the network 126 from the service provider 102 shown in FIG. 1. Information present in the PSI table 214 may be periodically or at least intermittently updated. Information that may be present in the PSI table 214 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some embodiments, the PSI table 214 may be divided into a number of tables, such as a NIT (Network Information Table), a PAT (Program Association Table), a PMT (Program Management Table), etc.

Table 1 below provides a simplified example of the PSI table 214 for several television channels. It should be understood that in other embodiments, many more television channels may be represented in the PSI table 214. The PSI table 214 may be periodically or at least intermittently. As such, television channels may be reassigned to different satellites and/or transponders, and the PTR 110 may be able to handle this reassignment as long as the PSI table 214 is updated.

TABLE 1

| Channel | Satellite | Transponder | ECM PID | Audio PIDs | Video PID |
|---|---|---|---|---|---|
| 4 | 1 | 2 | 27 | 1001 | 1011 |
| 5 | 2 | 11 | 29 | 1002 | 1012 |
| 7 | 2 | 3 | 31 | 1003 | 1013 |
| 13 | 2 | 4 | 33 | 1003, 1004 | 1013 |

It should be understood that the values provided in Table 1 are for example purposes only. Actual values, including how satellites and transponders are identified, may vary. Additional information may also be stored in the PSI table 214. Video and/or audio for different television channels on different transponders may have the same PIDs. Such television channels may be differentiated based on which satellite and/or transponder to which a tuner is tuned.

DVR functionality of the PTR 110 may permit a television channel to be recorded for a period of time. The DVR database 216 may store timers that are used by the processors 202 to determine when a television channel should be tuned to and recorded to the DVR database 245 of storage medium 208. In some embodiments, a limited amount of space of the storage medium 208 may be devoted to the DVR database 216. Timers may be set by the service provider 102 and/or one or more users of the PTR 110. DVR functionality of the PTR 110 may be configured by a user to record particular television programs. The PSI table 214 may be used by the PTR 110 to determine the satellite, transponder, ECM PID, audio PID, and video PID.

The user interface 218 may include a remote control, physically separate from PTR 110, and/or one or more buttons on the PTR 110 that allows a user to interact with the PTR 110. The user interface 218 may be used to select a television channel for viewing, view information from the EPG database 210, and/or program a timer stored to the DVR database 216 wherein the timer may be used to control the DVR functionality of the PTR 110.

Referring back to the tuners 204a-h, television channels received via satellite may contain at least some encrypted or scrambles data. Packets of audio and video may be scrambled to prevent unauthorized users, such as nonsubscribers, from receiving television programming without paying the service provider 102. When one of the tuners 204a-h is receiving data from a particular transponder of a satellite, the transponder stream may be a series of data packets corresponding to multiple television channels. Each data packet may contain a PID, which in combination with the PSI table 214, can be determined to be associated with a particular television channel.

Particular data packets, referred to as ECMs may be periodically transmitted. ECMs may be encrypted; the PTR 110 may use the smart card 222 to decrypt ECMs. The smart card 222 may function as the CA (Controlled Access) which performs decryption of encryption data to obtain control words that are used to descramble video and/or audio of television channels. Decryption of an ECM may only be possible when the user (e.g., who is associated with the PTR 110) has authorization to access the particular television channel associated with the ECM. When an ECM is received by the demultiplexer 220 and the ECM is determined to correspond to a television channel being stored and/or displayed, the ECM may be provided to the smart card 222 for decryption.

When the smart card 222 receives an encrypted ECM from the demultiplexer 220, the smart card 260 may decrypt the ECM to obtain some number of control words. In some embodiments, from each ECM received by the smart card 222, two control words are obtained. In some embodiments, when the smart card 222 receives an ECM, it compares the ECM to the previously received ECM. If the two ECMs match, the second ECM is not decrypted because the same control words would be obtained. In other embodiments, each ECM received by the smart card 222 is decrypted; however, if a second ECM matches a first ECM, the outputted control words will match; thus, effectively, the second ECM does not affect the control words output by the smart card 222. When an ECM is received by the smart card 222, it may take a period of time for the ECM to be decrypted to obtain the control words. As such, a period of time, such as about 0.2-0.5 seconds, may elapse before the control words indicated by the ECM can be obtained. The smart card 222 may be permanently part of the PTR 110 or may be configured to be inserted and removed from the PTR 110.

The demultiplexer 220 may be configured to filter data packets based on PIDs. For example, if a transponder data stream includes multiple television channels, data packets corresponding to a television channel that are not desired to be stored or displayed by the user may be ignored by the demultiplexer 255. As such, only data packets corresponding to the one or more television channels desired to be stored and/or displayed may be passed to either the descrambling engine 224 or the smart card 222; other data packets may be ignored. For each channel, a stream of video packets, a stream of audio packets and/or a stream of ECM packets may be present, each stream identified by a PID. In some embodiments, a common ECM stream may be used for multiple television channels. Additional data packets corresponding to other information, such as updates to the PSI table 214, may be appropriately routed by the demultiplexer 220.

The descrambling engine 224 may use the control words output by the smart card 222 in order to descramble video and/or audio corresponding to television channels for storage and/or presentation. Video and/or audio data contained in the transponder data stream received by the tuners 204a-h may be scrambled. The video and/or audio may be descrambled by the descrambling engine 224 using a particular control word. Which control word output by the smart card 222 to be used for successful descrambling may be indicated by a scramble control identifier present within the data packet containing the scrambled video or audio. Descrambled video and/or audio may be output by the descrambling engine 224 to the storage medium 208 for storage, such as part of the DVR database 216 for example, and/or to the decoder 226 for output to a television or other presentation equipment via the television interface 212.

For simplicity, the PTR 110 of FIG. 2 has been reduced to a block diagram; common parts, such as a power supply for example, have been omitted. Further, some routing between the various modules of PTR 110 has been illustrated. Such illustrations are for exemplary purposes only. The state of two modules not being directly or indirectly connected does not indicate the modules cannot communicate. Rather, connections between modules of the PTR 110 are intended only to indicate possible common data routing. It should be understood that the modules of the PTR 110 may be combined into a fewer number of modules or divided into a greater number of modules. Further, the components of the PTR 110 may be part of another device, such as built into a television. Also, while the PTR 110 may be used to receive, store, and present television channels received via a satellite, it should be understood that similar components may be used to receive, store, and present television channels via a cable network.

Figure 3:
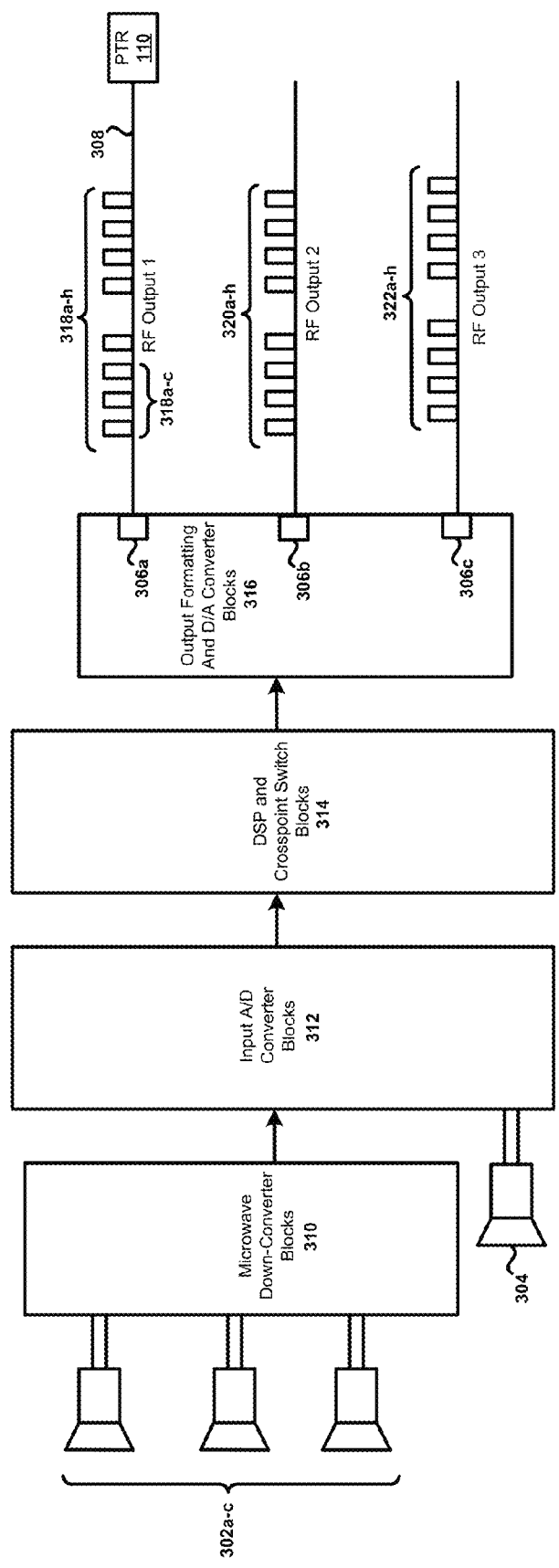
FIG. 3 shows an example low-noise block downconverter architecture.

Referring now to FIG. 3, an example architecture of the LNB 118 of FIG. 1 is shown. In general, one or more modules or components of the LNB 118 may be realized in or as, or incorporated within or on, for example, a particular ASIC (Application Specific Integrated Circuit), SoC (System on Chip), and/or other type of integrated circuit implementation. Further, in FIG. 3, the LNB 118 may process the incoming satellite signals so that the LNB 118 may source channels containing programming to the PTR 110 according to a channel-stacking content sourcing scheme. In this example, the LNB 118 may be configured as a channel-stacking LNB. Other embodiments are however possible. For example, the LNB 118 may be configured as a band-translation LNB. Similarly, when a particular LNB is channel-stacking-enabled, that LNB may source channels containing programming to a particular multi-tuner receiver, for example, that is also channel-stacking-enabled. Other embodiments are possible. For example, a particular LNB may be, configurably, both channel-stacking-enabled and band-translation-enabled. Similarly, a particular television receiver may be, configurably, both channel-stacking-enabled and band-translation-enabled. Similarly, As discussed further below, a channel-stacking implementation may be beneficial at least because an appropriately configured LNB may select a number of frequency bands from any combination of satellites, and stack and send those bands on a single coaxial cable to a particular multi-tuner receiver for further processing. In many instances, such a single cable drop may be desirable at least for aesthetic and possibly practical reasons. A band-translation implementation has similar benefits, but is fundamentally different in that 500 MHz swaths of bandwidth are transferred from an LNB to a television receiver for further processing. In contrast, 30 MHz swaths of bandwidth are transferred from an LNB to a television receiver for further processing in a channel-stacking implementation.

The LNB 118 may be mounted to or integrated with a feedhorn that is coupled to the satellite dish 108 of FIG. 1, but may include RF probes 302a-c, along with an auxiliary RF probe 304, and RF output ports 306a-c. In this example, the probes 302a-c may operate independently from each other, and the LNB 118 may detect or receive incoming signals broadcast from each of the satellites 106a-c via the probes 302a-c, assuming that the satellite dish 108 is properly orientated towards the sky. The ports 306a-c too may be independent from each other, and each of the respective ports 306a-c may be coupled to a particular distinct television receiver via coaxial cable, for example, to source channels containing programming as requested by each respective television receiver. For example, the port 306a may be coupled to the PTR 110 via a coaxial cable 308 as shown in FIG. 3. In this example, the ports 406b-c may each be coupled to a different television receiver, respectively.

In operation, a first stage 310 in the signal path may at least amplify and mix down incoming satellite signals to an intermediate frequency band, such as L-Band or S-Band for example. It is contemplated that architecture the first stage 310, much like all stages of the LNB 118, may be implementation-specific, and may evolve as technology evolves. In one embodiment, the first stage 310 may be realized as or include a heterodyne along with additional components to mix down an input signal down to an intermediate frequency for transfer across the coaxial cable 308 for example. Other embodiments are however possible. For example, the first stage 310 may be implemented as a direct conversion block, where an input signal is mixed down to baseband. Still other embodiments are possible. A second stage 312 in the signal path may sample incoming satellite signals according to the Nyquist Theorem, so that the signals may be further processed in the digital domain following the second stage 312. A third stage 314 and a fourth stage 316 in the signal path may operate on or further process the digitized signals so that the LNB 118 may source channels containing programming and in accordance with a particular content sourcing scheme to a particular receiver coupled to one of the ports 306a-c.

For example, as shown in FIG. 3 and mentioned above, the LNB 118 is configured as a channel-stacking LNB. Accordingly, a first plurality of channels or frequency bands 318a-h, each with a width of about 30 MHz, are shown as being created and output by the LNB 118 on the port 306a. Further, a second plurality of channels or frequency bands 320a-h, each with a width of about 30 MHz, are shown as being created and output by the LNB 118 on the port 306b. Still further, a third plurality of channels or frequency bands 322a-h, each with a width of about 30 MHz, are shown as being created and output by the LNB 118 on the port 306c. In general, FIG. 3 is intended to represent or indicate that each of the eight tuners 204a-h of the PTR 110 may request a distinct, particular 30 MHz frequency band from any one of the satellites 106a-c, and yet receive the frequency band in the frequency range for which a corresponding tuner has already been programmed. For example, the tuner 204a as shown in FIG. 2 may request any particular 30 MHz frequency band that is broadcast from or by the satellite 106a, and the LNB 118 may then serve that particular frequency band to the tuner 204a as channel or frequency band 318a as shown in FIG. 3. A similar discussion may apply to any one of the tuners 204b-h in connection with any one of the satellites 106a-c.

Further, each tuner of a particular eight-tuner receiver coupled to the port 306b via coaxial cable may request any particular 30 MHz frequency band broadcast from or by one of satellite 106a-c, and yet receive it in the frequency range for which a respective tuner has already been programmed.

Still further, each tuner of a particular eight tuner receiver coupled to the port 306c via coaxial cable may request any particular 30 MHz frequency band broadcast from or by one of satellite 106a-c, and yet receive the frequency band in the frequency range for which a corresponding tuner has already been programmed.

In the present example, a particular transponder band located within a particular polarity band, that is about 500 MHz in bandwidth, broadcast by a particular satellite is about 30 MHz, and thus each of the respective frequency bands 318a-h, 320a-h, and 322a-h may be distinct and correspond to a particular transponder band within a particular polarity band broadcast by a particular satellite. In this manner, the LNB 118 configured as a channel-stacking LNB as described in connection with FIG. 3, and may be considered analogous to a transponder band filter. Each transponder band passed to a particular television receiver may be processed by the receiver so that a particular requested service (e.g., HBO®, CNN®, etc.) may be extracted and output by the receiver for presentation by a display device, such as the television 114c for example. In the example of FIG. 3, the intermediate frequency band used to transfer the respective blocks of frequency bands 318a-h, 320a-h, and 322a-h to a particular receiver may have a width of about 1 GHz. Other embodiments are however possible.

Figure 4:
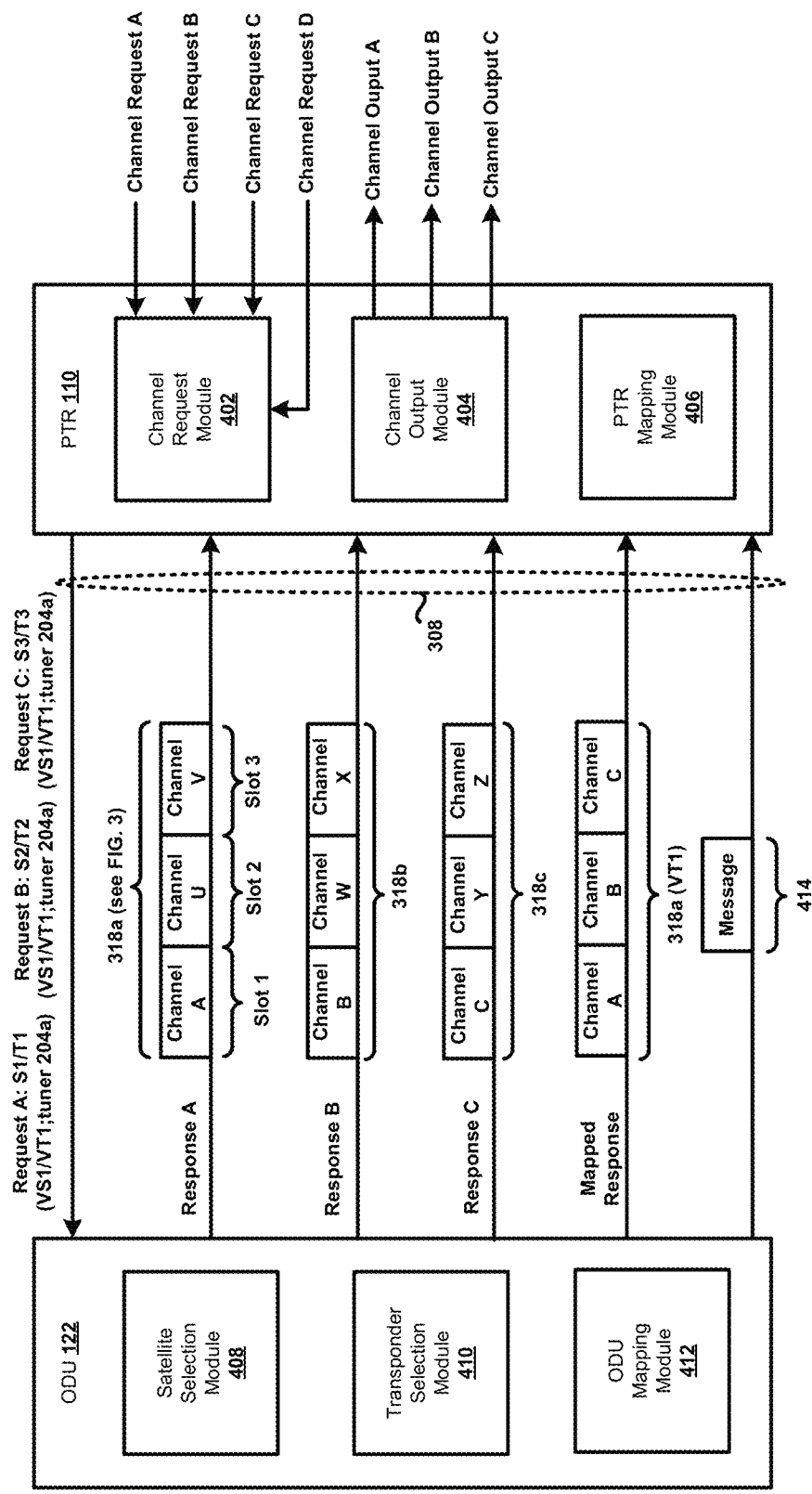
FIG. 4 shows aspects of the example satellite system of FIG. 1 in further detail.

Referring now additionally to FIG. 4, a block diagram is shown illustrating particular components of the example system 100 of FIG. 1. More specifically, FIG. 4 shows a number of logical modules of both the PTR 110 and the ODU 122 of FIG. 1. For example, the PTR 110 may at least include a channel request module 402, a channel output module 404, and a PTR mapping module 406. In general, the PTR mapping module 406 may correspond to the mapping module 124 mentioned above in connection with FIG. 1 and FIG. 2. The ODU 122 may at least include a satellite selection module 408, a transponder selection module 410, and an ODU mapping module 412. In general, the ODU mapping module 412 may correspond to the one or more logical modules 120 mentioned above in connection with FIGS. 1-2. Other embodiments are possible.

For example, in some embodiments, one or more respective components of the PTR 110 as shown in FIG. 4 may be wholly or at least partially located on one or more other components of the example system 100 of FIG. 1. For example, one or more respective components of the PTR 110 as shown in FIG. 4 may be wholly or at least partially located on a particular one of the STRs 112a-b. Further, any of the logical modules of both the PTR 110 and the ODU 122 as shown in FIG. 4 may be wholly or at least partially implemented in one or more of firmware, software, and hardware.

For brevity, in FIG. 4 it is assumed that the PTR 110 includes only three of the tuners 204a-h as shown in FIG. 2, namely tuners 204a-c. In this example, the LNB 118 may at most output the frequency bands 318a-c to the port 306a, as itemized in FIG. 3. Further, it is assumed that three distinct television channels fit within a particular transponder band that is about 30 MHz wide. For example, the television channel ABC® may occupy about a third of a particular 30 MHz transponder bandwidth, the television channel CBS® may occupy about a third of the particular 30 MHz transponder bandwidth, and the television channel NBC® may occupy about a third of the particular 30 MHz transponder bandwidth. Other embodiments are possible. For example, in many instances, four distinct television channels may fit within a particular transponder band that is about 30 MHz wide. FIG. 4 shows three television channels for brevity.

In practice, the channel request module 402 may send a Request A to the ODU 122 over the coaxial cable 308 in response to a Channel Request A. The Channel Request A may be initiated in or by any number of different ways. For example, a user be may channel surfing and the Channel Request A may be sent to the channel request module 402 by the PTR 110 in response to a detected channel-up or channel-down channeling event. Many other embodiments are possible though. For example, the Channel Request A may be sent to the channel request module 402 by the PTR 110 in response to a detected activation of a recording timer.

Depending on the particular television channel being requested, the Request A may specify or include a particular satellite identifier and transponder identifier. For example, assuming the particular requested television channel is ESPN®, and that ESPN® is broadcast on satellite 1 transponder 1 (e.g., transponder 1 of satellite 106a), the particular satellite identifier and transponder identifier of the Request A may conceptually take the form of S1/T1 (i.e., Satellite 1 Transponder 1) as shown in FIG. 4. In response to the Request A, the satellite selection module 408 of the ODU 122 may switch the LNB 118 to select satellite S1 in this example, and the transponder selection module 410 may switch the LNB 118 to select transponder T1 of satellite S1, and then the ODU 122 may return that particular transponder bandwidth as a Response A over the coaxial cable 308. In general, the satellite selection module 408 and the transponder selection module 410 may be implemented as a single logical module so that the switching performed by the LNB 118 to select S1/T1 is performed in one specific motion or action. That operation is broken up in the present discussion for discussion purposes.

As mentioned above, it is assumed that three distinct channels fit within a particular transponder band that is about 30 MHz wide, and in this example the television channel or service ESPN® (referred to as Channel A in FIG. 4) may be positioned within Slot 1 of the bandwidth associated with the particular transponder T1 of satellite S1, whereas some different, arbitrary television channels U and V may be positioned within Slots 2 and 3, respectively. Other embodiments are possible. For example, Channel A may be generally positioned within any one of Slots 1-3 of the Response A as shown in FIG. 3. In any case, it will be appreciated that since channels U and V are not necessarily of specific interest, the bandwidth associated which transporting those channels to the PTR 110 is effectively wasted. As discussed in further detail below, the present disclosure addresses this and other issues.

The channel output module 404 of the PTR 110 may receive the Response A, which in this example may correspond to the frequency band 318a as shown in FIG. 3, and extract and output Channel A as a Channel Output A to another resource of the PTR 110 for further processing. For example, ESPN® may be recorded by the PTR 110 for later viewing and/or sent to the television 114c by the PTR 110 for immediate viewing. In either case, a single particular tuner, such as tuner 204a for example, of the PTR 110 may be allocated or commanded by the PTR 110 to receive or tune to the frequency band 318a. A similar discussion may apply to a Channel Request B and a Channel Request C, respectively, as shown in FIG. 4. For example, in response to the Channel Request B, and the Channel Request C, each received at any particular arbitrary time, the channel request module 402 may send to the ODU 122 a Request B, and a Request C, over the coaxial cable 308.

Both the Channel Request B and the Channel Request C may be initiated in or by any number of different ways, and depending on the particular television channel being requested, the Request B may specify or include a particular satellite identifier and transponder identifier, and the Request C may specify or include a particular satellite identifier and transponder identifier. For example, the particular satellite identifier and transponder identifier may take the form S2/T2 (e.g., transponder 2 of satellite 106b) for the Request B as shown in FIG. 4, and the particular satellite identifier and transponder identifier may take the form S3/T3 (e.g., transponder 3 of satellite 106c) for the Request C as shown in FIG. 4.

In response to the Request B, the satellite selection module 408 may switch the LNB 118 to select satellite S2 in this example, and the transponder selection module 410 may switch the LNB 118 to select transponder T2 of satellite S2, and then the ODU 122 may return that particular transponder bandwidth as a Response B over the coaxial cable 308. Similarly, in response to the Request C, the satellite selection module 408 may switch the LNB 118 to select satellite S3 in this example, and the transponder selection module 410 may switch the LNB 118 to select transponder T3 of satellite, and then the ODU 122 may return that particular transponder bandwidth as a Response C over the coaxial cable 308.

The channel output module 404 of the PTR 110 may receive the Response B, which in this example may correspond to the frequency band 318b as shown in FIG. 3, and the Response C, which in this example may correspond the frequency band 318c as shown in FIG. 3, and extract and output Channel B and Channel C to another resource of the PTR 110 as a Channel Output B and a Channel Output C, for further processing as desired. Similar to the above discussion in connection with the Channel Request A, a single particular tuner, such as tuner 204b for example, of the PTR 110 may be allocated or commanded by the PTR 110 to receive or tune to the frequency band 318b, and a single particular tuner, such as tuner 204c for example, of the PTR 110 may be allocated or commanded by the PTR 110 to receive or tune to the frequency band 318c. This is because each particular tuner 204a, 204b, and 204c may be configured to tune only to a single particular transponder bandwidth or transport stream at a time.

Instead of allocating a different tuner to enable the PTR 110 to record or output for immediate display each of Channel A, Channel B, and Channel C as currently discussed, however, the ODU 122 and the PTR 110 together may select Channel A, Channel B, and Channel C, at the level of the ODU 122, and then place or insert each of those respective channels onto a "virtual transponder" that a single particular tuner of the PTR 110 may be allocated or commanded by the PTR 110 to receive or tune to. Accordingly, the single particular tuner may be used to access and output each of Channel A, Channel B, and Channel C, despite those three television channels being located or broadcast by a different satellite transponder. Such a solution may, among other things, allow the PTR 110 to effectively simulate the presence of nine distinct tuners, even though the PTR 110 only has three tuners 204a-c in this example.

In other words, the PTR 110 may simultaneously output and/or or record nine distinct programs each one broadcast by any one of the satellites 106a-c on any arbitrary transponder, despite only having the three tuners 204a-c. This is in contrast to typical or conventional systems where in many instances a television program requested by a television receiver is embedded in a transponder bandwidth of multiple television channels, the majority of which may be of no interest, such as that shown in Response A in FIG. 4. In that implementation, the bandwidth associated which transporting the television channels to the PTR 110 that are of no specific interest is effectively wasted.

To address this and other issues, in practice and in response to the Channel Request A as discussed in the present example, the channel request module 402 may initially query the PTR mapping module 406 of the PTR 110. The PTR mapping module 406 may map the particular satellite identifier and transponder identifier that is of the form S1/T1 to a virtual satellite identifier and transponder identifier that is of the form VS1/VT1, and map or specify that the Channel A is to be inserted into Slot 1 of the virtual transponder VT1. In addition, the PTR mapping module 406 may assign or otherwise associate the Channel A with a particular one of the tuners 204*a-c*, such as the tuner 204*a* for example. In general, the channel request module 402 may insert this information into the Request A so that the PTR 110 may coordinate with the ODU 122 to insert Channel A, Channel B, and Channel C onto a virtual transponder that the tuner 204*a* may be commanded to tune to.

Additionally, in response to the Channel Request B and the Channel Request C as discussed in the present example, the channel request module 402 may initially query the PTR mapping module 406 of the PTR 110. The PTR mapping module 406 may map the particular satellite identifier and transponder identifier that is of the form S2/T2 to the virtual satellite identifier and transponder identifier VS1/VT1, and map or specify that the Channel B is to be inserted into Slot 2 of the virtual transponder VT1. In addition, the PTR mapping module 406 may assign or otherwise associate the Channel B with the particular tuner 204*a*. In addition, the PTR mapping module 406 may map the particular satellite identifier and transponder identifier that is of the form S3/T3 to the virtual satellite identifier and transponder identifier VS1/VT1, and map or specify that the Channel C is to be inserted into Slot 3 of the virtual transponder VT1. In addition, the PTR mapping module 406 may assign or otherwise associate the Channel C with the particular tuner 204*a*.

In response to the Request A, the Request B, and the Request C, the satellite selection module 408 may switch the LNB 118 to select the appropriate satellite, and the transponder selection module 410 may switch the LNB 118 to select the appropriate transponder, and then the ODU mapping module 412 may extract and map Channel A to Slot 1 of the frequency band 318*a*, Channel B to Slot 2 of the frequency band 318*a*, and Channel C to Slot 3 of the frequency band 318*a*, and return that particular transponder as a Mapped Response over the coaxial cable 308. In this example, the particular tuner 204*a* may tune to the frequency band 318*a*, yet the frequency band 318*a* may be addressable by the tuner 204*a* as "VT1," that is, a virtual transponder. Prior to, or simultaneously, the ODU mapping module 412 may send a message 414 to the PTR mapping module 406 that indicates to the PTR mapping module 406 that frequency band 318*a* (VT1) includes in Slot 1 the Channel A as requested in the Request A, includes in Slot 2 the Channel B as requested in the Request B, and includes in Slot 3 the Channel C as requested in the Request C. In time, the Request A may be received by the ODU 122 prior to the Request B and the Request C, and thus this is the reason that Channel A may be mapped to Slot 1 of the virtual transponder VT1. Subsequently, assuming that Request B is received by the ODU 122 before the Request C, and thus this is the reason that Channel B may be mapped to Slot 2 of the virtual transponder VT1 and that that Channel C may be mapped to Slot 3 of the virtual transponder VT1. Accordingly, it may be preferred that a requested television channel may be mapped to a particular Slot of the a particular virtual transponder based on when in time the associated channel request is received. Other embodiments are however possible.

Continuing with the example communication sequence, the channel output module 404 of the PTR 110 may receive the Mapped Response, and extract and output Channel A, Channel B, and Channel C to another resource of the PTR 110 as the Channel Output A, the Channel Output B, and the Channel Output C, for further processing as desired. In this example though, only a single tuner is used to acquire and output Channel A, Channel B, and Channel C, despite those three channels being location on different satellite transponders. In addition to more efficient resource allocation, that is each and every slot within with a transponder band returned to the PTR 110 from the ODU 122 is used and not wasted, the example solution may effectively enable the PTR 110 to simultaneously output and/or or record nine distinct television programs of particular or specific interest, despite only having the three tuners 204*a-c*. This is continuing under the assumption that three distinct channels fit within a particular transponder band that is about 30 MHz wide.

When the number of slots for a particular virtual transponder are fully occupied, the PTR mapping module 406 may create another virtual transponder, and assign that virtual transponder to a particular tuner that has at least one free slot. For example, when the channel request module 402 receives a Channel Request D, the channel request module 402 may initially query the PTR mapping module 406 of the PTR 110. The PTR mapping module 406 may determine that virtual transponder VT1 is full, and then map the particular satellite identifier and transponder identifier that is of the form S1/T2, for example, to a virtual satellite identifier and transponder identifier that is of the form VS1/VT2, for example, and map or specify that the Channel D is to be inserted into Slot 1 of the virtual transponder VT2. In addition, the PTR mapping module 406 may assign or otherwise associate the Channel D with a particular one of the tuners 204*b-c*, such as the tuner 204*b* for example. Here, the PTR 110 may coordinate with the ODU 122 to insert Channel D onto a virtual transponder that the tuner 204*b* may be commanded to tune to in a manner similar to that described above. Such a procedure is discussed in further detail below in connection with at least FIG. 5, and may continue until each of the three tuners 204*a-c* is allocated and assigned to receive a particular virtual transponder.

Figure 5:
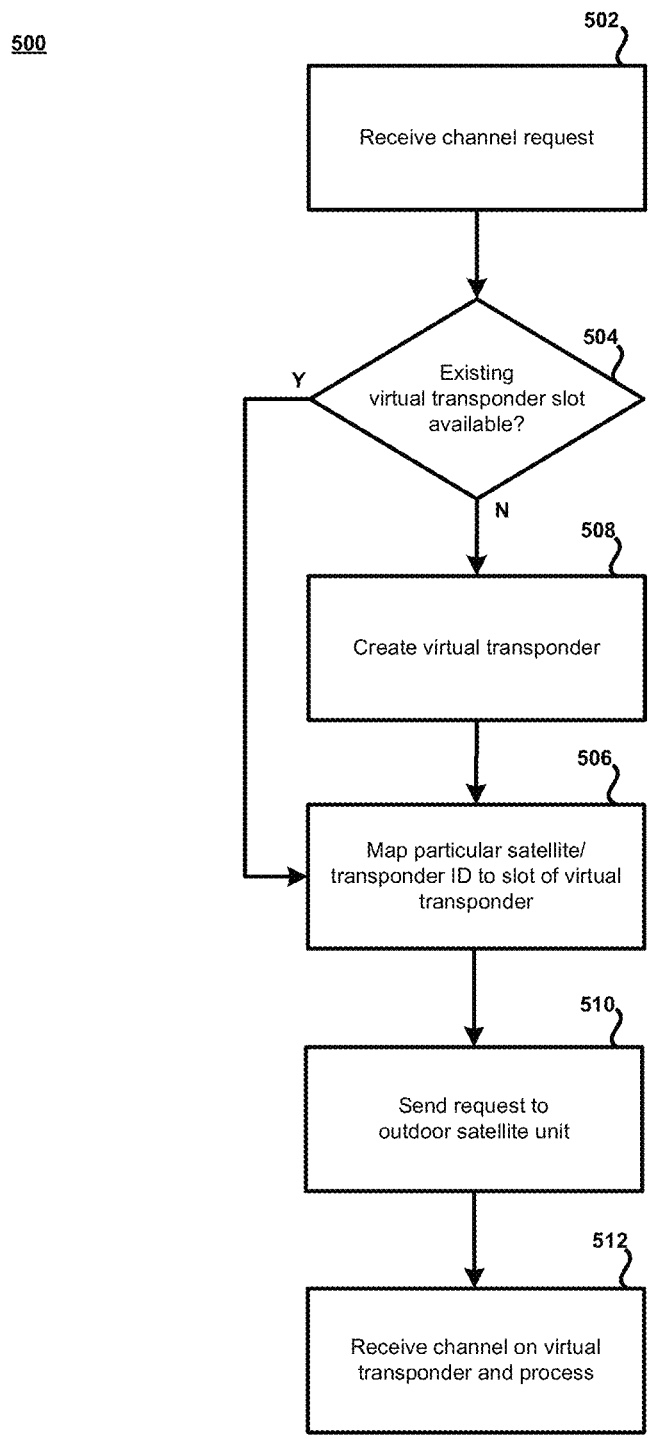
FIG. 5 shows a first example method in accordance with the present disclosure.

Referring now to FIG. 5, a first example method 500 is shown in accordance with the present disclosure. Steps or modules of the example method 500 may be performed on or by the PTR 110 as discussed above in connection with FIGS. 1-4. Other embodiments are however possible. For example, one or more of the steps or modules of the method 500 of FIG. 5 may performed on or by at the ODU 122. Still other embodiment are possible.

At step 502, the PTR 110 may receive a Channel Request. In general, the PTR 110 may receive the Channel Request in response to a detected channeling event, such as a detected channel-up or channel-down channeling event for example. Many other embodiments are possible though. For example, the PTR 110 may receive the Channel Request in response to a detected activation of a recording timer. Still other embodiments are possible. For example, data requests may be detected, such as a request to download guide information, a video on-demand movie, etc., may be detected or otherwise received by the PTR 110.

At step 504, the PTR 110 may determine whether a particular Slot within an existing virtual transponder is available for allocation. For example, the PTR 110 may determine that a Channel A is currently being recorded by the PTR 110, and that Slot 1 of a virtual transponder VT1 is occupied or otherwise allocated as a particular swath of bandwidth for the audio/video associated with Channel A. However, the PTR 110 may determine that Slot 2 or Slot 3 of the virtual transponder VT1 is unoccupied or otherwise unallocated as a particular swath of bandwidth for any audio/video of particular or specific interest. In this instance, flow within the example method 500 may branch to step 506. Otherwise, flow within the example method 500 may branch to step 508.

At step 508, the PTR 110 may create a virtual transponder and assign or otherwise associate the created virtual transponder with a particular tuner of the PTR 110. For example, assuming that the tuner 204b of the PTR 110 is in idle state or mode, and that the tuner 204a is currently associated with the virtual transponder VT1 mentioned above (step 504), the PTR 110 may create a virtual transponder VT2 and assign or otherwise associate that virtual transponder with the 204b tuner of the PTR 110. Flow within the example method 500 may then branch to step 506. At step 506, the PTR 110 may map a particular satellite identifier and transponder identifier associated with a television channel corresponding to the Channel Request (step 502) to a particular virtual satellite identifier and transponder identifier, and map or specify that the television channel of interest is to be inserted into a particular Slot of a virtual transponder.

For example, and assuming flow to step 506 branched from step 508, the PTR 110 may map a particular satellite identifier and transponder identifier that is of the form S1/T2 (e.g., the television channel of the Channel Request is on transponder 2 of satellite 106a) to a virtual satellite identifier and transponder identifier that is of the form VS1/VT2, and map or specify that the television channel associated with the Channel Request (step 502) is to be inserted into Slot 1 of the virtual transponder VT2. Flow within the example method 500 may then branch to step 510.

At step 510, the PTR 110 may send a Request to the ODU 122 over the coaxial cable 308 as shown in FIG. 3. Continuing with the example discussed at step 506, the Request may include the particular satellite identifier and transponder identifier S1/T2, along with the virtual satellite identifier and transponder identifier VS1/VT2, so that the ODU 122 may switch the LNB 118 to select transponder T2 of satellite 51, and then the ODU 122 may map and extract the television channel corresponding to the Channel Request (step 502) to Slot 1 of the virtual transponder VT2. At step 512, the PTR 110 may receive a Mapped Response, and extract and output the television channel corresponding to the Channel Request (step 502) to another resource of the PTR 110 for further processing.

Figure 6:
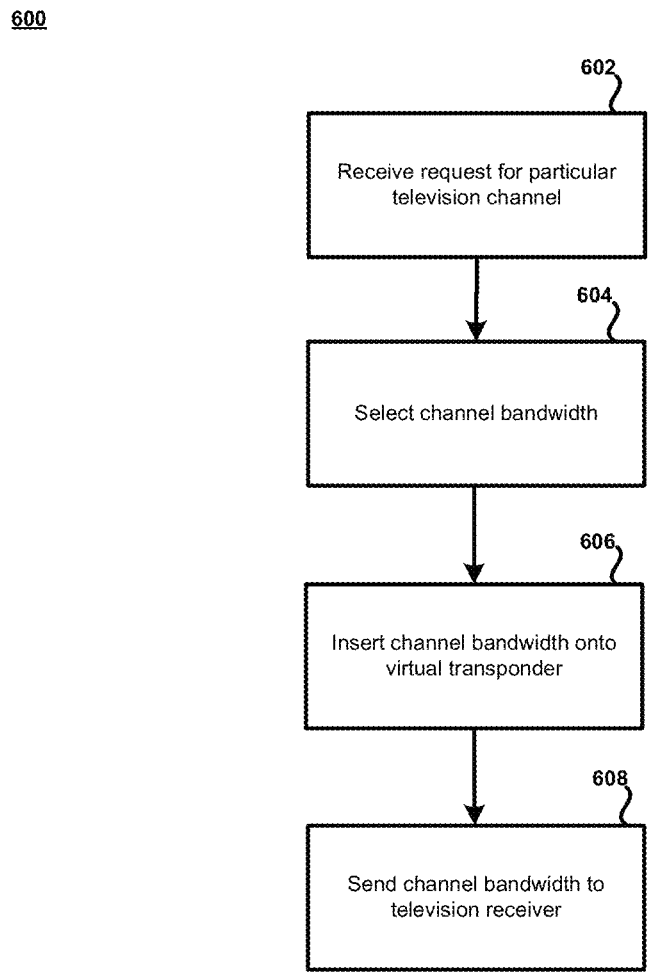
FIG. 6 shows a second example method in accordance with the present disclosure.

Referring now to FIG. 6, a second example method 600 is shown in accordance with the present disclosure. Steps or modules of the example method 600 may be performed on or by the ODU 122 as discussed above in connection with FIGS. 1-4. Other embodiments are however possible. For example, one or more of the steps or modules of the method 600 of FIG. 6 may performed on or by at the PTR 110. Still other embodiment are possible.

At step 602, the ODU 122 may receive a Request for a particular television channel. Depending on the particular television channel being requested, the Request may specify or include a particular satellite identifier and transponder identifier. For example, assuming the particular requested television channel is ESPN®, and that ESPN® is broadcast on satellite 1 transponder 1 (e.g., transponder 1 of satellite 106a), the particular satellite identifier and transponder identifier of the Request may take the form of S1/T1. Additionally, the Request may specify or include a virtual satellite identifier and transponder identifier. For example, the virtual satellite identifier and transponder identifier may take the form VS1/VT1. Other embodiments are possible.

At step 604, the ODU 122 may select the transponder bandwidth for the particular television channel. For example, the ODU 122 may switch the LNB 118 to select the appropriate satellite and transponder based on the particular satellite identifier and transponder identifier S1/T1 as received in the Request at step 602. At step 606, the ODU 122 may insert the transponder bandwidth onto the virtual transponder based on the received virtual satellite identifier and transponder identifier (step 602). For example, the ODU 122 may extract and map the particular television channel to Slot 1 of the virtual transponder VT1. At step 608, the ODU 122 may send the bandwidth associated with the particular television channel to the PTR 110 for further processing. In this example, a particular tuner of the PTR 110 may be allocated or commanded by the PTR 110 to receive or tune to the virtual transponder VT1.

Figure 7:
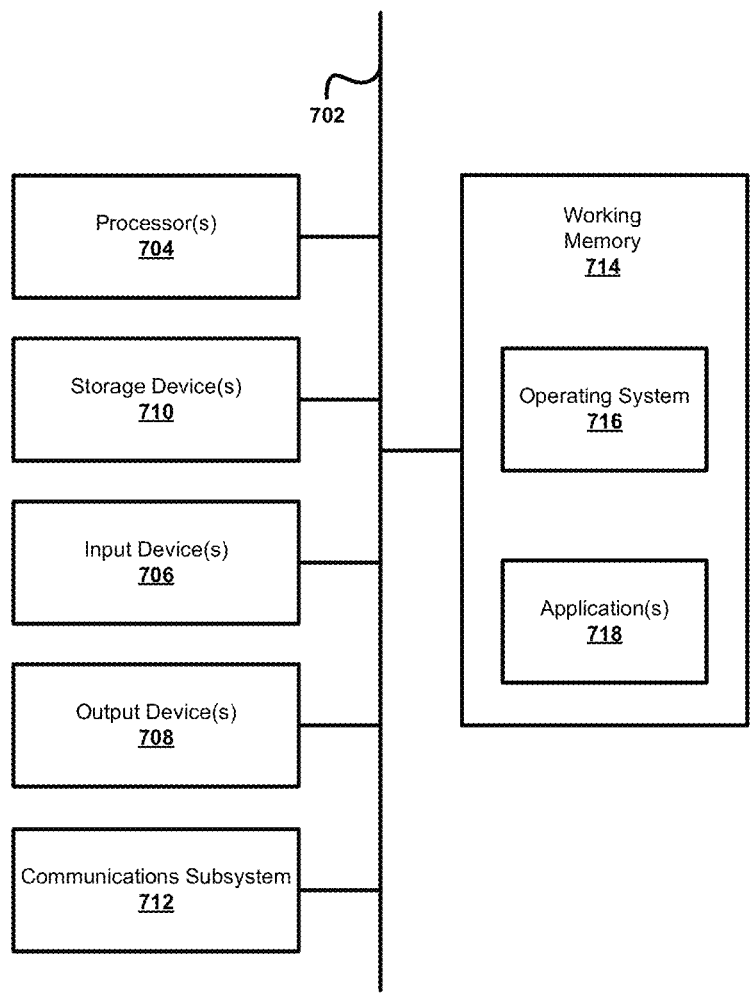
FIG. 7 shows an example computing system or device.

FIG. 7 shows an example computer system or device 700 in accordance with the present disclosure. An example of a computer system or device includes an enterprise server, blade server, desktop computer, laptop computer, tablet computer, personal data assistant, smartphone, gaming console, STB, television receiver, and/or any other type of machine configured for performing calculations. Any particular one of the previously-described computing devices may be wholly or at least partially configured to exhibit features similar to the computer system 700, such as any of the respective elements of at least FIG. 1. Further, the computer device 700 may be configured to perform and/or include instructions that, when executed, cause the computer system 700 to perform the method of FIG. 5 and/or the method of FIG. 6. Still further, the computer device 700 may be configured to perform and/or include instructions that, when executed, cause the computer system 700 to instantiate and implement functionality of the PTR 110 and/or the ODU 122 of at least FIG. 1.

The computer device 700 is shown comprising hardware elements that may be electrically coupled via a bus 702 (or may otherwise be in communication, as appropriate). The hardware elements may include a processing unit with one or more processors 704, including without limitation one or more general-purpose processors and/or one or more special-purpose processors (such as digital signal processing chips, graphics acceleration processors, and/or the like); one or more input devices 706, which may include without limitation a remote control, a mouse, a keyboard, and/or the like; and one or more output devices 708, which may include without limitation a presentation device (e.g., television), a printer, and/or the like.

The computer system 700 may further include (and/or be in communication with) one or more non-transitory storage devices 710, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 700 might also include a communications subsystem 712, which may include without limitation a modem, a network card (wireless and/or wired), an infrared communication device, a wireless communication device and/or a chipset such as a Bluetooth™ device, 702.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 712 may permit data to be exchanged with a network (such as the network described below, to name one example), other computer systems, and/or any other devices described herein. In many embodiments, the computer system 700 will further comprise a working memory 714, which may include a random access memory and/or a read-only memory device, as described above.

The computer device 700 also may comprise software elements, shown as being currently located within the working memory 714, including an operating system 716, device drivers, executable libraries, and/or other code, such as one or more application programs 718, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 710 described above. In some cases, the storage medium might be incorporated within a computer system, such as computer system 700. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 700) to perform methods in accordance with various embodiments of the disclosure. According to a set of embodiments, some or all of the procedures of such methods are performed by the computer system 700 in response to processor 704 executing one or more sequences of one or more instructions (which might be incorporated into the operating system 716 and/or other code, such as an application program 718) contained in the working memory 714. Such instructions may be read into the working memory 714 from another computer-readable medium, such as one or more of the storage device(s) 710. Merely by way of example, execution of the sequences of instructions contained in the working memory 714 may cause the processor(s) 704 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 700, various computer-readable media might be involved in providing instructions/code to processor(s) 704 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 710. Volatile media may include, without limitation, dynamic memory, such as the working memory 714.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), and etc., any other memory chip or cartridge, or any other medium from which a computer may read instructions and/or code. Various forms of computer-readable media may be involved in carrying one or more sequences of one or more instructions to the processor(s) 704 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 712 (and/or components thereof) generally will receive signals, and the bus 702 then might carry the signals (and/or the data, instructions, etc. carried by the signals) to the working memory 714, from which the processor(s) 704 retrieves and executes the instructions. The instructions received by the working memory 714 may optionally be stored on a non-transitory storage device 710 either before or after execution by the processor(s) 704.

It should further be understood that the components of computer device 700 can be distributed across a network. For example, some processing may be performed in one location using a first processor while other processing may be performed by another processor remote from the first processor. Other components of computer system 700 may be similarly distributed. As such, computer device 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   receiving, by a television receiver from an outdoor satellite unit, a first television channel within a particular bandwidth that is addressable by a particular tuner of the television receiver;
   receiving, by the television receiver, a request from a user to tune to a second television channel, the second television channel broadcast on a satellite transponder different than the first television channel;
   sending, by the television receiver to the outdoor satellite unit, a request to receive the first television channel and the second television channel within the particular bandwidth that is addressable by the particular tuner; and
   receiving, at the television receiver, the first television channel and the second television channel within the particular bandwidth that is addressable by the particular tuner, and at least one other television channel within the particular bandwidth that is broadcast on a satellite transponder different than the first television channel and the second television channel.

2. The method of claim 1, further comprising receiving at least one other television channel within the particular bandwidth that is broadcast on a satellite transponder similar to one of the first television channel and the second television channel.

3. The method of claim 1, further comprising sending the request to receive the first television channel and the second television channel within the particular bandwidth in response to detection of a channel-change command.

4. The method of claim 1, further comprising sending the request to receive the first television channel and the second television channel within the particular bandwidth in response to detection of activation of a recording timer.

5. The method of claim 1, wherein the particular bandwidth has a band width that accommodates at least three distinct television channels.

6. The method of claim 1, wherein the particular bandwidth is formatted according to a channel-stacking content sourcing scheme.

7. The method of claim 1, wherein the particular bandwidth is about 30 MHz in band width.

8. A television receiver, comprising:
   a plurality of tuners;
   one or more processors; and
   a memory communicatively coupled with and readable by the one or more processors and having stored therein processor-readable instructions that, when executed by the one or more processors, cause the one or more processors to:
      process a first television channel embedded within a particular bandwidth that is addressable by a particular tuner of the plurality of tuners;
      detect a request to tune to a second television channel, the second television channel broadcast on a satellite transponder different than the first television channel;
      send to an outdoor satellite unit a request to receive the first television channel and the second television channel within the particular bandwidth that is addressable by the particular tuner; and
      process the first television channel and the second television channel as embedded within the particular bandwidth that is addressable by the particular tuner, and at least one other television channel as embedded within the particular bandwidth that is broadcast on a satellite transponder different than the first television channel and the second television channel.

9. The television receiver of claim 8, wherein the memory having stored therein processor-readable instructions which, when executed by the one or more processors, cause the one or more processors to:
   process at least one other television channel as embedded within the particular bandwidth that is broadcast on a satellite transponder similar to one of the first television channel and the second television channel.

10. The television receiver of claim 8, wherein the memory having stored therein processor-readable instructions which, when executed by the one or more processors, cause the one or more processors to:
   send the request to receive the first television channel and the second television channel within the particular bandwidth in response to detection of a channel-change command.

11. The television receiver of claim 8, wherein the memory having stored therein processor-readable instructions which, when executed by the one or more processors, cause the one or more processors to:
   send the request to receive the first television channel and the second television channel within the particular bandwidth in response to detection of activation of a recording timer.

12. A method, comprising,
   receiving, by an outdoor satellite unit from a television receiver, a request for access to a television channel broadcast on a particular satellite transponder different from a satellite transponder for which a current channel is being broadcast and delivered; and sending, by the outdoor satellite unit to the television receiver, the television channel, the current channel, and at least one other television channel embedded within a particular bandwidth that is addressable by a particular tuner of the television receiver, the at least one other television channel broadcast on a satellite transponder different than the particular satellite transponder.

13. The method of claim 12, wherein the particular bandwidth has a band width that accommodates at least three distinct television channels.

14. The method of claim 12, wherein the particular bandwidth is formatted according to a channel-stacking content sourcing scheme.

15. The method of claim 12, wherein the particular bandwidth is about 30 MHz in band width.

* * * * *